May 18, 1926.

J. H. PROCTOR

TUBE

Filed August 10, 1921  2 Sheets-Sheet 1

1,585,600

John H. Proctor INVENTOR.

BY

Gardner D. Pierson ATTORNEY.

May 18, 1926.
J. H. PROCTOR
TUBE
Filed August 10, 1921   2 Sheets-Sheet 2
1,585,600
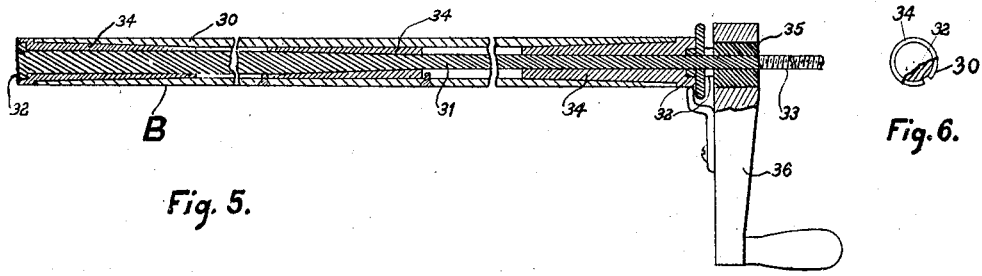
Fig. 5.   Fig. 6.
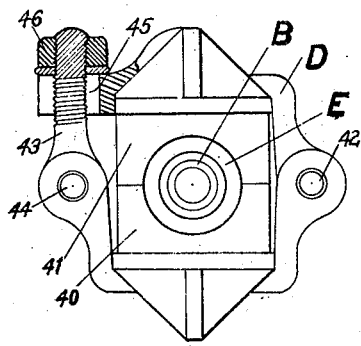
Fig. 7.
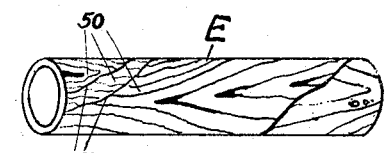
Fig. 8.
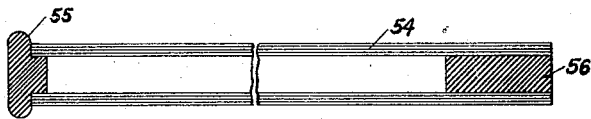
Fig. 10.
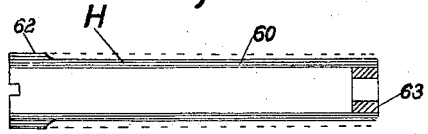
Fig. 11.
Fig. 9.
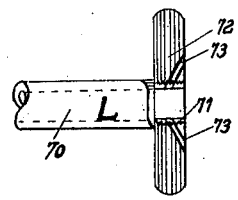
Fig. 12.      Fig. 13.
Fig. 14.
John H. Proctor
INVENTOR.
BY
Gardner W. Pearson
ATTORNEY.

Patented May 18, 1926.

1,585,600

UNITED STATES PATENT OFFICE.

JOHN H. PROCTOR, OF ANDOVER, MASSACHUSETTS, ASSIGNOR TO THE PLYWOOD TUBE, INC., OF LAWRENCE, MASSACHUSETTS, A CORPORATION OF MASSACHUSETTS.

TUBE.

Application filed August 10, 1921. Serial No. 491,234.

This invention relates to tubes which may be used for various purposes wherein lightness and strength are desirable, and especially where lightness, strength, and resistance to moisture and heat are desirable.

Such tubes are particularly useful in the manufacture of textiles for use as rolls, beams, spools, bobbins, and other similar articles for winding textile material, and may also be used for conduits and insulators for electric wires, and even for broom and mop handles.

Broadly speaking, my invention consists of forming a tube by winding spirally, preferably on a mandrel, a thin sheet of wood such as is known as veneer, preferably of the rotary cut type, the spiral of wood having between its layers an intervening spiral layer of glue, preferably of a waterproof type.

Preferably, such tubes are made by winding the wood with intervening glue under pressure upon a core shell which is preferably of the expanding type, and retaining the tube under pressure until the glue has set. I prefer not only to wind the wood under pressure but when the tube has been built up, to expand the core shell from the interior after the tube has been placed in a mold whereby the outer surface can be expressed or molded with a firm, smooth finish, without creases.

As is well known in the trade, there are now recognized three types of veneer. These are, first, that sliced with the grain; second, sawed with the grain; and third, rotary cut, where the log is held at each end between centers on the lathe and revolved against a knife which shaves off a thin continuous strip without waste, the grain of such strip running crosswise of the cut sheet.

I prefer to use such rotary cut veneer as it is stronger, cheaper, and winds more readily without kinks or bulges.

It is apparent that as the veneer is cut from the log it would naturally assume the spiral in which it lay in the log, and that if it is flattened out, as it would be on a table or when passed between rolls, the pores in the concave side tend to open and small fissures form on that side. On the other hand, if it is wound with the concave side nearer the axis into a tube which is smaller than the original scroll, the pores and fissures on the outer or convex side tend to open while those on the concave side are forced together.

I prefer to first straighten out my sheet of veneer by passing it through rollers and, while straightened out, to spread glue on the concave side by means of a pressure roller while the fissures on that side are open. I then prefer to wind it under pressure into a smaller roll whereby the glue in the fissures on the concave side is compacted and the glue is forced into the fissures which form on the convex side.

As it is apparent that such fissures occur at the relatively weakest spots, and as the glue used is stronger than the wood, the resulting tube, having its weak spots reinforced and being bound together by the glue with the grain of the wood naturally crossing more or less, is much stronger than a similar tube turned on a lathe from solid wood.

It is also apparent that, ordinarily in wood, a flaw or weak grain weakens the wood to a greater depth than the thickness of a veneer of one thirty-second to one sixty-fourth inch, and that by displacing these weak spots by wrapping the veneer in a spiral they do not register in spiral layers, and greater resulting strength is obtained than in solid wood.

It is also a fact that the grain of most woods does not lie in straight and parallel lines but curves materially, and I take advantage of this irregular grain.

I am well aware that tubes have been built up of several layers of veneer wound helically and otherwise, with the grain of different layers crossing; but I claim to be the first to make a cheap tube of sufficient strength for many practical purposes by winding up a single sheet of rotary cut veneer with its convex side out, in a single spiral around a suitable core.

More particularly I claim to be the first to so wind under pressure and to take the resulting tube and subject it to either additional interior or exterior pressure or both until the glue sets.

Still more particularly I claim to be the first to use such a tube for winding textile materials as part of a bobbin, spool, or beam.

In the drawings, Fig. 1 is a diagrammatic representation of the manner in which rotary cut veneer is cut from the log.

Fig. 5 is a vertical section showing one form of expansible core, and

Fig. 6 is a view from the left end thereof.

Fig. 7 is an end view of one form of pressure mold.

Fig. 8 is a perspective view partly in section showing a tube of my construction.

Fig. 9 is an exaggerated and enlarged end view illustrating the manner in which a tube of my construction is formed.

Fig. 10 is a vertical sectional view of a broom handle.

Fig. 11 is a vertical sectional view of one type of bobbin.

Fig. 12 is an elevation partly in section of another type of bobbin.

Fig. 13 is a view from the left of Fig. 12.

Fig. 14 is an elevation partly in section showing the end of a spool.

Figure 1:
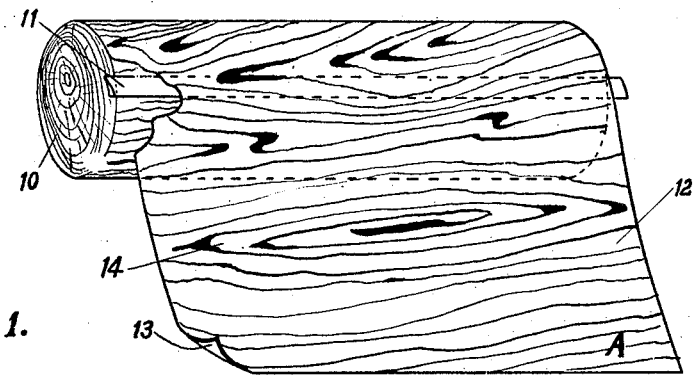

Fig. 1 shows diagrammatically how the sheet of rotary cut veneer A is cut from the log 10 by means of a knife 11 in a well known manner. I will call 12 the outside, convex or face side, and 13 the concave, inside or back of the sheet. The grain of irregular formation is shown at 14.

Figure 2:
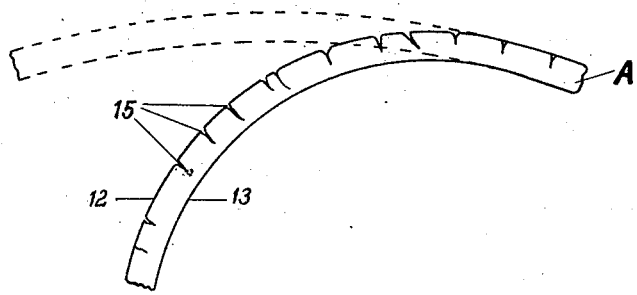
Fig. 2 is a small magnified longitudinal side view of rotary cut veneer showing in dotted lines the natural curve and in full lines the curve when wound to a smaller diameter.

As shown in Fig. 2, when such a sheet of veneer A, whose normal curve is shown by the dotted lines, is bent to a smaller curve as it generally would be for forming small tubes such as bobbins or broom handles, outside fissures indicated at 15 occur in irregular lines around the outside.

Figure 3:
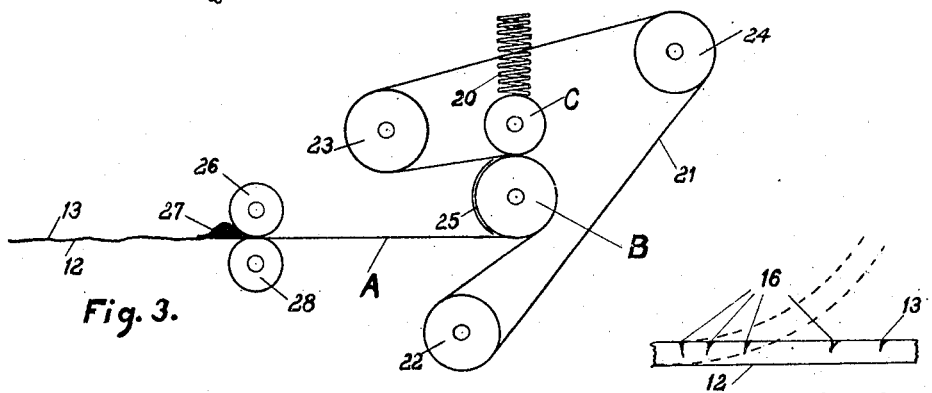
Fig. 3 is a diagrammatic side view of a machine which may be used for spreading glue and rolling my tubes.

In Fig. 3, I show diagrammatically how such a sheet of veneer A is wound on a mandrel B. This mandrel may be rotated in any suitable machine in contact with a pressure roll C which is forced against it by means of a spring 20. Mandrel B serves as a core and is preferably of the expansible type, such as shown more in detail in Fig. 5.

I find a convenient form of winding is to use a belt 21 which passes over pulleys 22, 23 and 24, as well as mandrel B, whereby the sheet A can be fed around with belt 21 and may be separated therefrom by a suitable guide 25 which carries it along and causes it to wind in a spiral.

Figure 4:
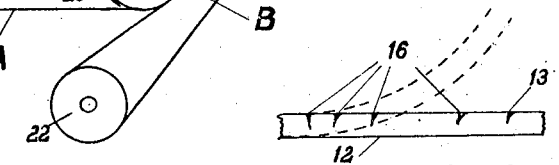
Fig. 4 is a much enlarged longitudinal side view showing rotary cut veneer flattened out.

The veneer A is fed between the rollers 26 and 28 with its concave surface or back 13 at the top, and its convex surface at the bottom, and as it is straightened out between these rollers and mandrel B, small fissures shown at 16 in Fig. 4 develop and these are filled with the glue 27 as it passes between rollers 26 and 28.

A roller 26 may be used to spread glue, indicated at 27, evenly on sheet A in any well known manner. The machine for winding is immaterial, as in fact it might be wound upon a hand mandrel or core with manual pressure on a suitable table, if such method were not too uncertain and expensive.

An expansible mandrel B is shown in Fig. 5 as comprising an outer shell 30 of split steel tubing, a spindle 31 having annular shoulders 32, 32, and a threaded end 33 together with tubular wedges 34, 34, 34, an expanding nut 35 threaded on the end 33 and a removable handle 36 whereby each nut 35 can be turned so as to force the wedges 34 and 34 together thereby expanding the shell 30 and with it the tube.

In Fig. 7, I show a mold D in which the core B and tube E can be placed. Mold D comprises two halves 40 and 41 hinged at 42, one being provided with bolt 43 pivoted at 44 and the other with a slot 45 in which bolt 43 can enter, together with a nut 46 whereby exterior pressure can be applied if desired.

In Fig. 8, I show a tube made in accordance with my invention which may be used for any purpose for which tubes are used, the spiral layers of veneer being shown at 50 and the intervening spiral layers of glue being shown at 51. Such a tube may be used for warp beams, conduits, and various other purposes.

In Fig. 10, I show an ordinary broom handle made up of a tube indicated at 54 and preferably having a head 55 and plug 56.

In Fig. 11, I show a type of bobbin used in textile machinery having a very thin wall and a relatively small head. This bobbin is indicated at H, the barrel 60 being smooth and thin. The head 62 might be made separately and put on, as shown in Figs. 12 or 13, or the barrel might be made the size of the head and then turned down as preferred. The plug 63 completes the bobbin.

In Figs. 12 and 13, I show another type of bobbin having a barrel 66 with corrugations 65, a metal tip 67 and a head 68 which is made by winding a narrow strip of rotary cut veneer around the barrel 66 after the barrel is finished.

Fig. 14 shows a spool L of well known type in textile manufacturing having a barrel 70 threaded at 71 to receive a head 72 shown as made of plywood, the spool being further held together by pins 73.

I show graphically in Fig. 9 the relative positions of the interior fissures 16 and exterior fissures 15 as well as the glue 51 which forms the spiral concentric with the sheet of veneer and also fills the fissures 15 and 16.

I prefer to use a waterproof glue of what is known commercially as the casein type, or I may use a glue of the blood albumen type.

It is apparent that I might use a solid core or mandrel instead of an expansible one, and that I might place this in a mold similar to B with or without pressure means, merely holding the tube in position until the glue set without being under any additional pressure.

I claim:

1. A tube for winding textile materials, formed of compressed rotary cut veneer with the average direction of its grain parallel to and its concave side nearer the axis of the tube wound convolutely upon itself, with layers of waterproof glue formed of casein or blood albumen for holding such layers together and making them waterproof.

2. A tube for winding textile materials, formed of compressed rotary cut veneer with the average direction of its grain parallel to and its concave side nearer the axis of the tube wound convolutely upon itself, with layers of waterproof glue between the layers of veneer for holding such layers together and making them waterproof.

3. A bobbin for winding textile materials, formed of rotary cut veneer having the average direction of its grain parallel to and its concave side nearer the axis of the bobbin wound convolutely upon itself, and having intervening convolute layers of glue between the layers of veneer for holding them together, combined with a head attached to said tube.

4. A tube for winding textile materials, formed of rotary cut veneer with the average direction of its grain parallel to and its concave side nearer the axis of the tube wound convolutely upon itself, with layers of waterproof glue between the layers of veneer for holding such layers together and making them waterproof.

5. A tube for winding textile materials, formed of rotary cut veneer with the average direction of its grain parallel to and its concave side nearer the axis of the tube wound convolutely upon itself, with layers of waterproof glue between the layers of veneer and penetrating the fissures and pores thereof, for holding such layers together and making them waterproof.

6. A tube for winding textile materials, formed of rotary cut veneer with the average direction of its grain parallel to and its concave side nearer the axis of the tube wound convolutely upon itself, with layers of glue between the layers of veneer and penetrating the fissures and pores thereof, for holding such layers together.

7. A tube formed of rotary cut veneer with the average direction of its grain parallel to and its concave side nearer the axis of the tube wound convolutely upon itself, with layers of glue between the layers of veneer and penetrating the fissures and pores thereof, for holding such layers together.

8. A tube formed of rotary cut veneer with the average direction of its grain parallel to the axis of the tube wound convolutely upon itself, with a convolute layer of glue between the layers of veneer for holding such layers together.

9. A relatively thin walled tube formed of compressed rotary cut veneer with the average direction of its grain parallel to and its concave side nearer the axis of the tube wound convolutely upon itself, with layers of water proof glue between the layers of veneer and pentrating the fissures and pores thereof, for holding such layers together.

JOHN H. PROCTOR.